April 12, 1932.　　　A. MONARD　　　1,854,054

METER FOR MEASURING QUANTITIES OF LIQUID

Filed Feb. 4, 1929　　　3 Sheets-Sheet 1

INVENTOR
Alfred Monard
By William C. Linton
ATTORNEY.

April 12, 1932.  A. MONARD  1,854,054
METER FOR MEASURING QUANTITIES OF LIQUID
Filed Feb. 4, 1929   3 Sheets-Sheet 2

INVENTOR
Alfred Monard
By William C. Linton
ATTORNEY.

April 12, 1932.  A. MONARD  1,854,054
METER FOR MEASURING QUANTITIES OF LIQUID
Filed Feb. 4, 1929  3 Sheets-Sheet 3

INVENTOR
Alfred Monard
By William C. Linton
ATTORNEY.

Patented Apr. 12, 1932                                              1,854,054

UNITED STATES PATENT OFFICE

ALFRED MONARD, OF PARIS, FRANCE, ASSIGNOR TO ATELIERS DE CONSTRUCTIONS MECANIQUES L'ASTER, OF IVRY-SUR-SEINE, FRANCE, A CORPORATION

METER FOR MEASURING QUANTITIES OF LIQUID

Application filed February 4, 1929, Serial No. 337,438, and in France February 16, 1928.

The present invention relates to improvements in meters for measuring out quantities of liquid, wherein is provided a slide adapted to connect the meter mechanism to the valve controlling the feed of the liquid, which slide carries at one end a transversely movable roller and a blocking arm cooperating with a disk actuated by the said mechanism and having at its periphery a cut-out part or notch for the said roller, and also a recess for the said arm. The other end of said slide is adapted to suitably hold the said valve as long as the said roller and blocking arm are out of their recesses.

However, due to the wear of the valve which may always occur, or to an incomplete operation of the push-piece, the valve may be slightly opened before the arm blocking the slide is released from its recess. This will on the one hand tend to set the apparatus in operation while on the other hand it will retain it in a positive manner, thus resulting in the breakage of a part of the apparatus by which the latter will be disabled.

To obviate all such accidents, according to my improved construction, the slide, with its roller and blocking arm, does not act directly upon the stem of the said supply valve, but it acts upon a socket or push-piece in which the said stem is engaged with a certain longitudinal play.

The said socket is urged from the valve by a weak spring, and on the other hand the movements of the socket are limited and guided by a tenon secured to the main frame and engaged in a diamond-shaped recess in the surface of the socket. The said socket further comprises tapered shoulders suitably spaced apart cooperating with a tapered contact surface formed upon the slide.

In order that the invention and its mode of operation may be readily understood by those skilled in the art I have, in the accompanying drawings, set out a possible embodiment of the invention.

Figure 1:
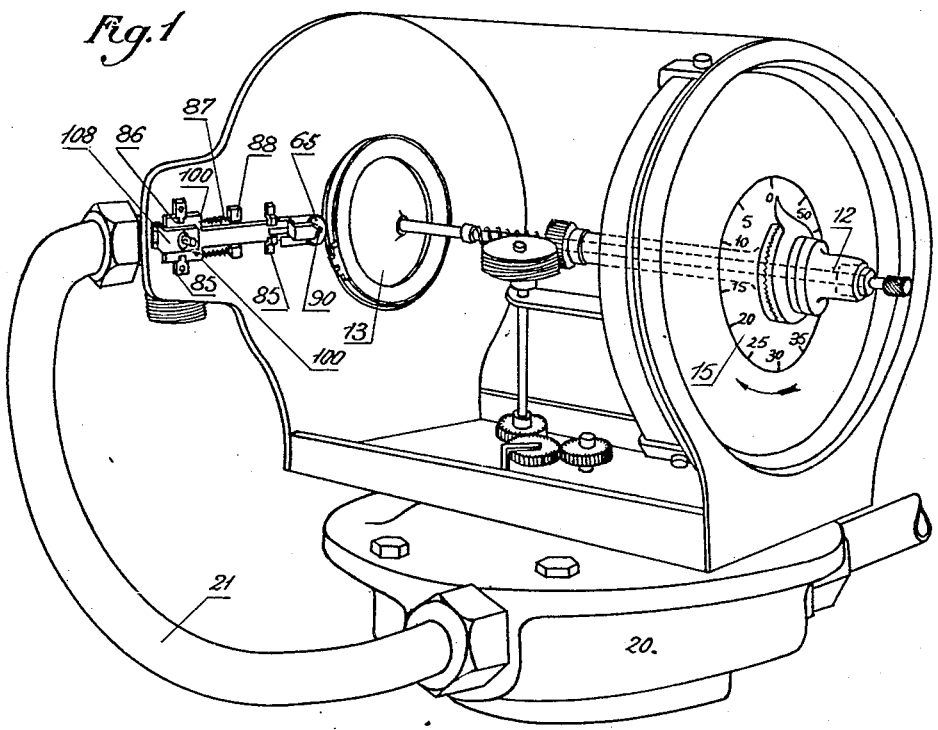
Fig. 1 is a general view of the meter apparatus comprising the said improvements.

Having more particular reference to the drawings wherein like characters of reference designate corresponding parts throughout, 13 indicates a disk having on its periphery a tapered cut-out part 81 and a recess 84 formed either on the disk or on a sector 83 secured to the said disk.

In cooperation with the said notch and recess is disposed a slide 61, which is suitably guided in the frame by supports 85 and rollers 86. The said slide is urged away from the disk 13 by one or more springs 87, in contact at one end with a stop 88 of the frame and at the other with a shoulder 100 of the slide.

The end of said slide adjacent the disk 13 is provided with a fork 66 carrying a stud 90 adapted for insertion into the recess 84. The fork holds between its branches an axle 64 on which is rotatable and also slidable a roller 65 outwardly urged by a spring 67 surrounding the said axle. The said roller has a cylindrical part adapted to roll upon the edge 80 of the said disk 13, and it also has a tapered part 91 adapted to exactly fit into the notch 81 of the disk 13. At the other end of the slide 61 is a tapered aperture 89.

The conduit supplying the liquid ends in the chamber 19 of a valve 28, which is held on its seat by a strong spring 29 and also by the pressure of the liquid. The said liquid flows through a pipe 21 into the driving mechanism contained in the casing 20 of the meter.

Figure 2:
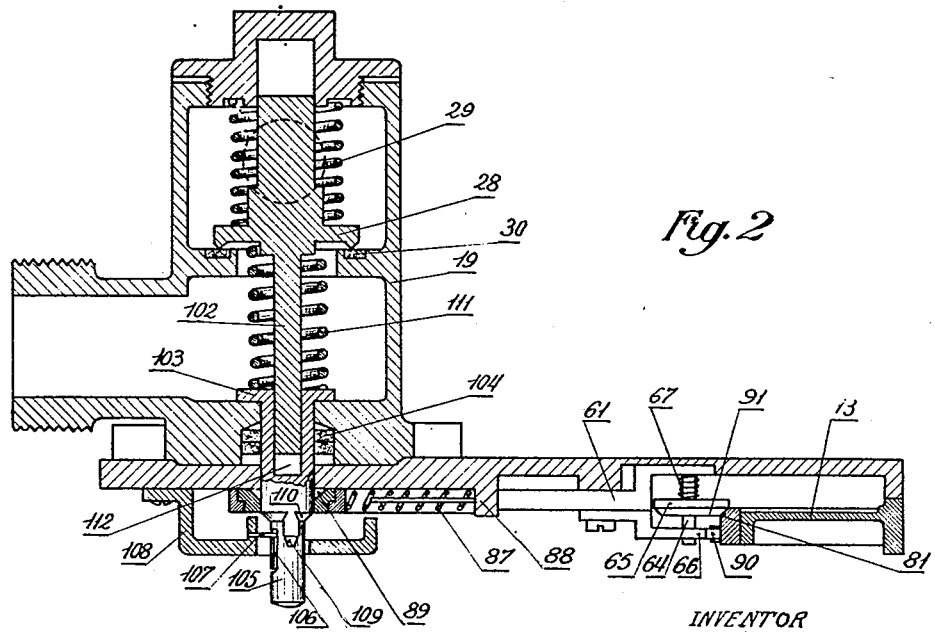
Fig. 2 is a sectional view of the corresponding part of the mechanism, with the valve in the closed position.

According to the invention, the said clack valve is provided with a rod or stem 102 which is engaged, with a considerable lengthwise play as shown at 112 in Figure 2, in a pushing socket 103 traversing the wall of the valve chamber through a stuffing box 104 and extending outwardly so as to form the push-piece 105.

At the outer surface of said socket 103 is formed the diamond-shaped groove 106 in which is engaged a tenon 107 mounted on a cap 108 secured to the frame of the apparatus.

The pushing socket 103 has also a tapered shoulder 109 which may make contact with the corresponding contact surface of the aperture 89 of the slide 61. The tapered shoulder extends only upon one-fourth of the circumference of the socket 103. A second shoulder 110, of the same height as the first-mentioned shoulder is also formed upon the socket 103, but at a point such that it will enter the aperture 89 when the push piece 105 is pressed in, whilst the shoulder 109, which is spaced from the first mentioned shoulder by ¼ of the circumference, will come into position only after a considerable stroke and also a rotation of the socket 103.

A spring of moderate power 111 is provided around the rod 102 whereby the said socket 103 is urged from the valve 28.

The operation is as follows.

It will be supposed that the maximum quantity recorded on the dial 15 of the apparatus is to be supplied. Herein the roller 65 and the said blocking arm 90 are respectively engaged in the notch 81 and the recess 84 of the disk 13. If the operation is commenced by pressing on the end 105 of the socket 103, the operator presses in the socket against the action of the spring 111 but without acting upon the valve 28. In fact, on the one hand the spring 111 is much weaker than the spring 29 added to the pressure of the fluid, and on the other hand a considerable lengthwise play is provided at 112 between the end of the socket 103 and the rod or stem 102 of the said valve. The stroke which can be thus given to the socket 103, without acting upon the valve, is sufficient to bring the shoulder 110 into coincidence with the aperture 89 of the slide 61.

Figure 3:
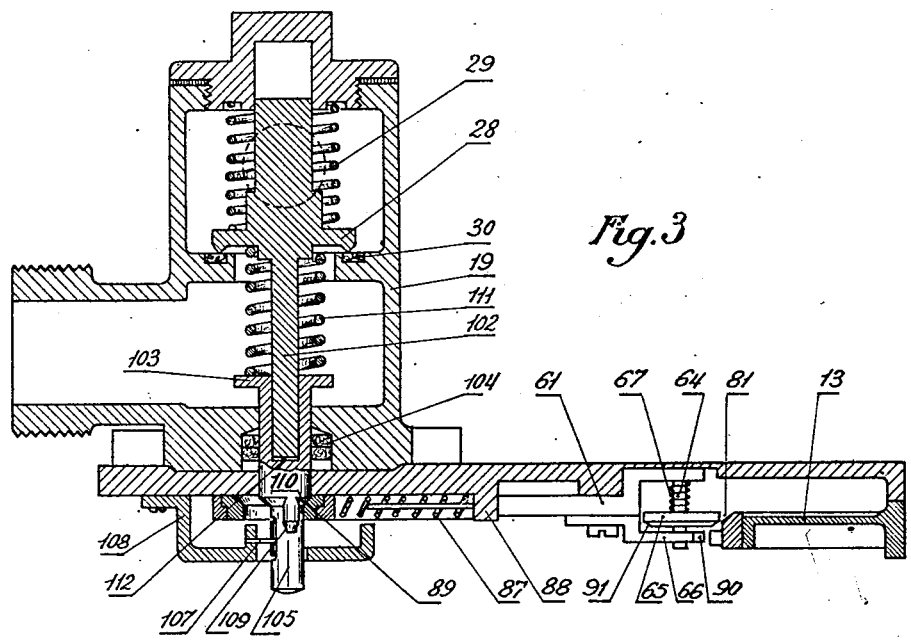
Fig. 3 shows this part of the mechanism after the first movement of said socket.
Figure 4:
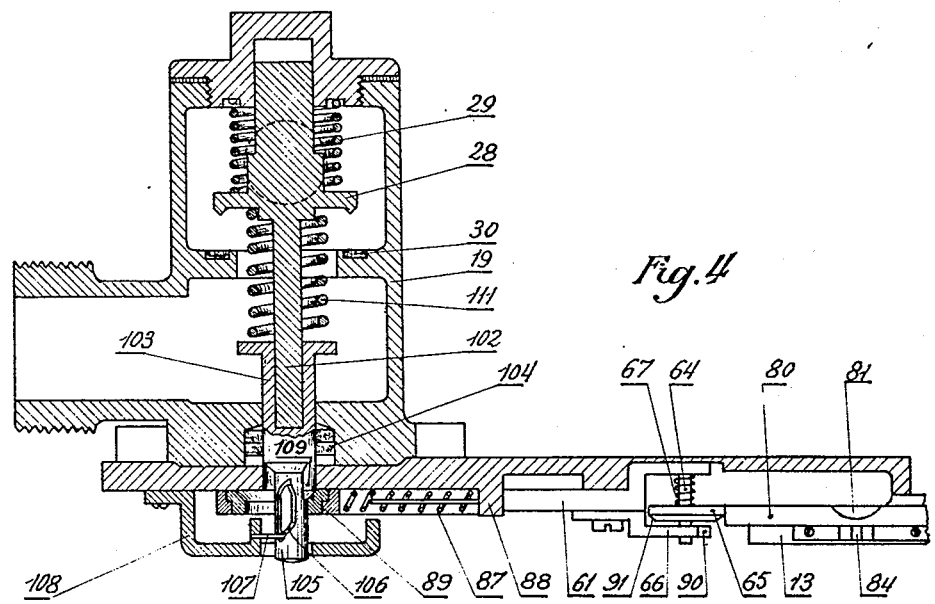
Fig. 4 is a corresponding view, with the valve open and the delivery commenced.
Figure 5:
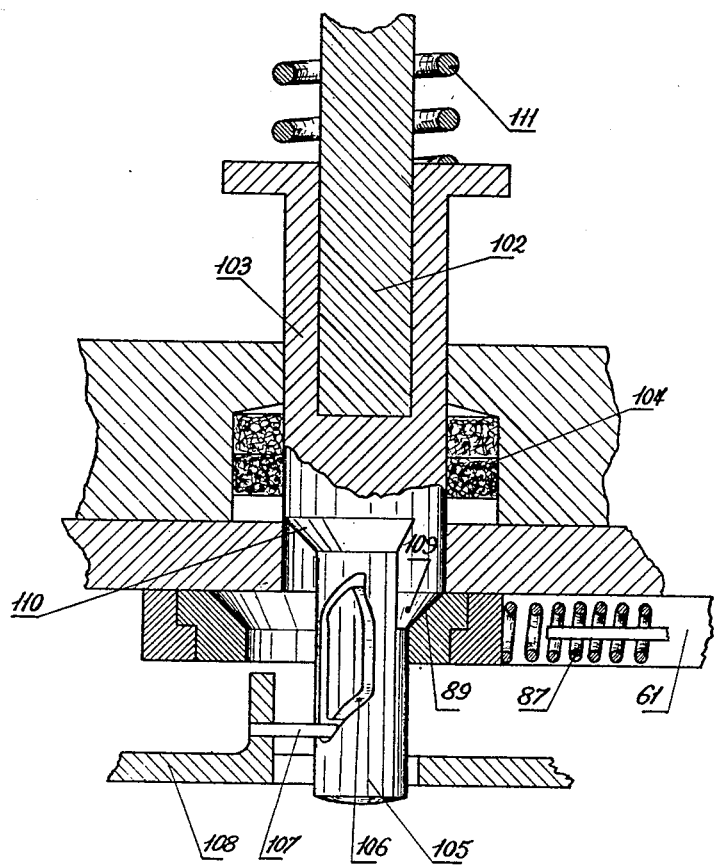
Fig. 5 is an enlarged detail showing the construction and co-operation of certain parts of my improved device.

Under the action of the springs 87, the said slide will be separated from the disk 13 in such manner that the roller 65 and the stud 90 will be disengaged at the same time from the notch 91 and the recess 84, respectively. However, since the valve 28 is always closed, the apparatus (comprising the disk) will not rotate, and the parts will remain in the position shown in Figure 3.

The tenon 107, which is engaged in a part of the groove 106 parallel to the axis of the socket 103, provides for an absolutely straight motion of the socket, but if the operator continues to press upon the surface 105, the end of the rod or stem 102 makes contact with the end of the socket 103, and the valve 28 thus opens. The liquid flows into the pipe 26, thus actuating the driving mechanism contained within the casing 20 and thereby turning the disk 13. This rotation can be effected without prejudice to the mechanism, since the arm 90 is now released from its recess 84. By pressing the socket 103 to the maximum, an inclined part of said groove 106 comes before the tenon 107 and the socket 103 will be rotated by ¼ revolution while being driven into the body of the apparatus.

This rotation brings the shoulder 109 into coincidence with the corresponding contact surface of the aperture 19, and if the operator then releases the said socket, the said shoulder 109 will make contact with the said surface. Since the roller 65 rolls on the edge 80 of the disk 13, the slide 61 cannot be moved towards the disk, and the contact surface of the aperture 89 retains the shoulder 109. In this manner the valve 28 is held open.

After a complete revolution of the disk 13, when the notch 81 comes below the roller 65, the slide 6 may move towards the disk by the action of the strong spring 29 whose effect is imparted by the tapered surface 109 to the tapered surface of the aperture 89.

Since nothing retains the valve 28, it will close abruptly, driving out the socket 103 which is guided by the tenon 107 and effects movement which are straight and also rotary, in the opposite direction to that preceding. At the end of the stroke, the socket has the position shown in Figure 2, and the apparatus is ready for the next feeding operation.

In the preceding description, it is supposed that the quantity of liquid to be delivered at each operation coincides with the maximum recorded on the dial 15 and thus corresponds to a complete revolution of the disk 13. Should it be desired to effect only a partial delivery, the operator releases, by rotating the button 12, the disk 13 from the arm 90 and rotates it in such manner that the angle between the said arm and the recess 84 will correspond to the quantity of liquid desired. Except for this change in the initial position, the operation of the mechanism is the same as before described.

Obviously, the parts herein described are susceptible of various modifications, and as an example, the guiding means for the socket 103 consisting of the tenon 107 and the groove 106, may be otherwise disposed.

I claim:

1. In a liquid meter, an inlet valve provided with a stem, a cam actuated by the meter, a slide operated by the cam and having a conical opening formed therethrough, a pushing socket engaging, with a longitudinal play, the end of the valve stem and extending through said opening in the slide, conical shoulders disposed on said socket, said shoulders being spaced with respect to each other in a longitudinal and transversal direction and co-operating with the conical opening in the slide to effect a mutual engagement between said pushing socket and slide.

2. In a liquid meter, an inlet valve provided with a stem, a cam actuated by the meter, a slide operated by the cam and having a conical opening formed therethrough, a pushing socket engaging, with a longitudinal play, the end of the valve stem and extending through said opening in the slide, conical shoulders disposed on said socket and spaced with respect to each other in longitudinal and transversal directions, said shoulders co-operating with the conical opening in the slide, a diamond-shaped groove formed on said socket and a tenon fixed in relation to the latter and engaged in said groove to impart a consecutive rectangular and angular movement to said pushing socket.

In testimony whereof I affix my signature.
ALFRED MONARD.